April 17, 1934.    J. G. HEASLET    1,955,125
CRAWLER TRACTOR
Filed Oct. 6, 1932

INVENTOR
James G. Heaslet
BY George Douglas Jones
ATTORNEY

Patented Apr. 17, 1934

1,955,125

UNITED STATES PATENT OFFICE 1,955,125

CRAWLER TRACTOR

James G. Heaslet, Shaker Heights, Ohio

Application October 6, 1932, Serial No. 636,561

6 Claims. (Cl. 180—1)

This invention relates to platforms and supports for the same, and more especially to platforms mounted on crawler tractors for the purpose of carrying auxiliary machinery.

In the past tractors have been used as mobile power units, having loads attached to the drawbar of the same.

The loads consisted of wagons or implements supported on wheels or runners and were either pulled or pushed over the ground as occasion required. Other types of implements have been pulled or pushed and carried by the tractor.

Auxiliary machinery has in the past been carried on wheels, or skids, receiving power directly connected thereto or from the tractor by means of a power take-off.

The purpose of this invention provides a mounting on the tractor for auxiliary machinery, receiving power directly from the tractor or from an auxiliary power plant carried thereby.

It has been found extremely economical to mount auxiliary machinery on the tractor and especially to drive the said machinery from the motive power of the tractor. By so doing, the extra cost of mobile mounting for the machinery is eliminated and obviously reduces the initial cost of the equipment materially, and when driven from the motive power of the tractor, enormous savings result.

Aside from the initial saving, having the auxiliary machinery carried directly on the tractor permits greater maneuverability of the tractor, that is:—the tractor may be driven over obstructed and rough terrain with ease which is difficult to negotiate when the implement is pulled by the tractor.

Therefore, an object of this invention is to provide a platform attached to the tractor on which auxiliary machinery may be mounted.

Another object of this invention is to mount a platform on a crawler tractor in horizontal relation thereto, the outer portion of which is supported by vertically extending legs pivoted at their lower ends to the axle on which the side frames of the tractor pivot.

Another object of this invention is the mounting of a platform on crawler tractors, the said platform having vertically extending supports pivotally secured to the axle on which the side frames pivot, the auxiliary machinery being mounted thereon in parallel relation to main power drive of the tractor, and, if desired, the said machinery may be driven therefrom.

Other objects of this invention will appear from the following description taken in connection with the drawing which forms a part of this invention and in which—

Figure 1:
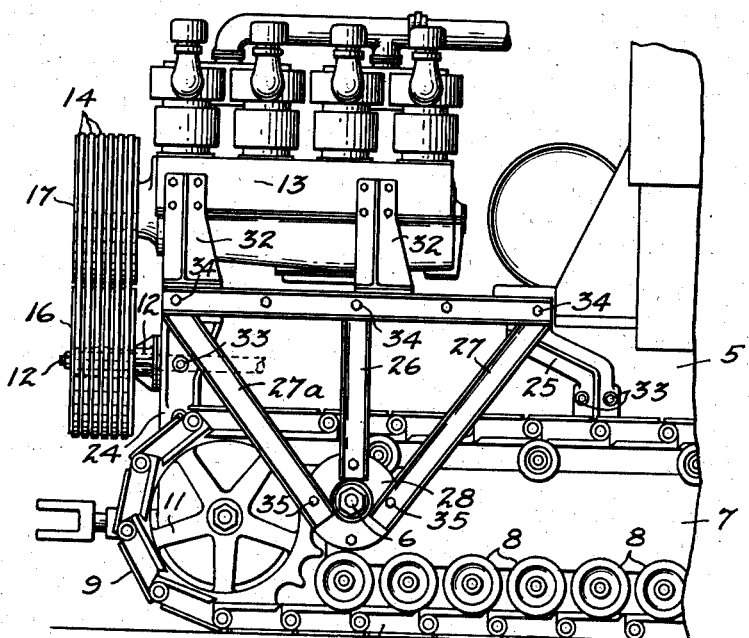
Fig. 1 is a side elevation of a portion of a crawler tractor, showing the horizontal platform and support therefor.
Figure 2:
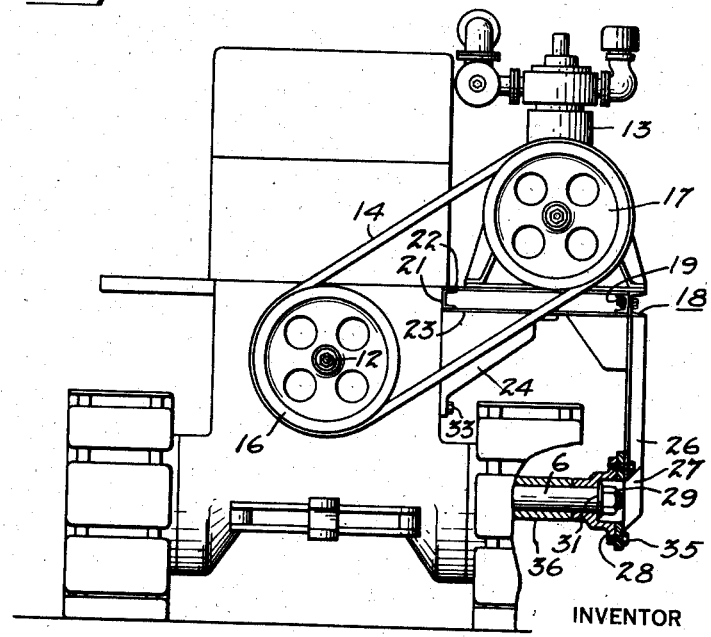
Fig. 2 is a rear elevational view of the tractor, showing the platform and support therefor.

Referring now to the drawing by character of reference in which numeral 5 is the main frame of a crawler tractor, having a shaft 6 securely mounted thereto, the side frame 7 is pivotally associated with the said shaft 6 and carries the rollers 8 which roll on the track 9 and is propelled by the sprocket wheel 11 which, in turn, is operated from the power of the tractor through suitable transmission mechanism.

A portion of this mechanism projects rearwardly from the main frame of the tractor, terminating in a driving shaft 12 on which may be mounted a pulley 16, or other suitable power transmitting means. For driving auxiliary machinery, such as compressor 13, on which is mounted a pulley 17, power may be transmitted by belts 14 or other suitable power transmitting means.

Mounted on the main frame is a horizontal frame 18, preferably made up of sections consisting of channel members 19 and 21 which are, in turn, tied together by suitable plates 22 and 23. This platform is secured to the main frame, preferably by brackets 24 and 25 which rigidly support the horizontal platform to the main frame of the tractor, preferably by bolts 33.

The outer portion of the platform is supported by downwardly extending legs 26, 27 and 27a, which are associated at their upper ends to outer portions of the platform preferably by bolts 34 or other suitable securing means, and the lower ends of the legs are secured preferably by bolts 35 to a retaining member 28 which is free to oscillate on the shaft 6. This member is held in position by a nut 29 screwed to the shaft 6, the said nut abuts a shoulder 31 on the shaft 6, which allows free oscillating movement of the retaining member 28. The said retaining member abuts a sleeve 36 which is secured to the shaft 6. The auxiliary machinery may be mounted on the platform by any suitable means such as brackets 32 which rigidly secure the said auxiliary machinery to the platform.

With a mounting such as has been described above, any suitable form of auxiliary machinery may be mounted on the platform and driven by the extended portion of the power transmission on which are mounted suitable driving means, such as pulleys and belts.

It will be noted that the auxiliary machinery is mounted on the platform parallel to the axis of the power transmission mechanism and, obviously, can be readily attached and detached as occasion requires. With this means of deriving power, suitable mechanism is generally installed in the tractors, whereby the power on this auxiliary transmission shaft can be connected or disconnected as desired. It will further be noted that the platform is rigidly associated with the main frame of the tractor and is pivotally supported on the shaft which carries the side frame member so that any movement of the side frames will not be transmitted back to the platform and this support permits of a wide overhang of the platform in order to accommodate bulky auxiliary machinery. It will be understood that various forms of the invention, other than those described above, may be used without departing from the spirit or scope of the invention:

What I claim is:—

1. In a tractor including a main frame, endless articulated tracks and operative mechanism therefor, said mechanism being pivotally mounted to the main frame, a horizontal platform detachably secured to the main frame, the outer portion of which is supported by vertically extending members pivotally associated with the member on which the track mechanism pivots.

2. In a tractor including a main frame, endless articulated tracks and operative mechanism therefor, said mechanism being pivotally mounted on the main frame, a horizontal platform secured to the main frame and supported by vertically extending legs rigidly associated with the platform and pivotally associated with the member carrying the track mechanism.

3. In a tractor including motive power, power transmission mechanism, a main frame carrying the said motive power and power transmission mechanism and an axle secured to the main frame, endless articulated tracks operated on driving and idler mechanism carried by a subframe pivotally associated with the said axle, a horizontal platform secured to the main frame, vertically extending supports rigidly associated with the platform and pivotally associated on the said subframe.

4. In a tractor, including a main frame, endless articulated tracks and operative mechanism therefor, said mechanism being pivotally mounted on the main frame, a horizontal platform detachably secured to the main frame, the outer portion of which is supported by vertically extending members, detachably associated with the member on which the track mechanism pivots.

5. In a tractor, including a main frame, endless articulated tracks and operative mechanism therefor, said mechanism being pivotally mounted to the main frame, a horizontal platform secured to the main frame and parallel to the axis thereof, the outer portion of the platform being supported by vertically extending members secured to the member on which the track mechanism pivots.

6. In a tractor, including a main frame, endless articulated tracks and operative mechanism therefor, said mechanism being pivotally mounted to the main frame, a platform extending over a portion of one of the endless articulated tracks; the outer portion of the platform being supported by vertically extending members secured to the member on which the track mechanism pivots.

JAMES G. HEASLET.